(12) United States Patent
Jang et al.

(10) Patent No.: US 7,369,335 B2
(45) Date of Patent: May 6, 2008

(54) OPTICAL PICKUP ACTUATOR

(75) Inventors: Dae jong Jang, Gyeonggi-do (KR); Duk-young Chong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/245,191

(22) Filed: Oct. 7, 2005

(65) Prior Publication Data
US 2006/0056081 A1    Mar. 16, 2006

Related U.S. Application Data

(60) Provisional application No. 10/337,888, filed on Jan. 8, 2003, now Pat. No. 7,006,307.

(30) Foreign Application Priority Data
Jan. 8, 2002   (KR) .................................. 2002-987

(51) Int. Cl.
*G02B 7/02* (2006.01)
(52) U.S. Cl. ...................... 359/824; 359/811; 359/814; 359/819; 369/44.11; 369/44.14
(58) Field of Classification Search ................ 359/814, 359/824, 811, 819; 369/44.15, 44.16, 44.17, 369/44.18, 44.19, 44.11, 44.12, 44.13, 44.14; 720/683
See application file for complete search history.

(56) References Cited

U.S. PATENT DOCUMENTS 5,663,840 A    9/1997   Matsui (Continued)

FOREIGN PATENT DOCUMENTS

EP    1 098 304    5/2001

(Continued)

OTHER PUBLICATIONS

Patent Abstracts of Japan for Japanese Patent Publication No. 8203103, published Aug. 9, 1996.

(Continued)

*Primary Examiner*—Hung Dang
*Assistant Examiner*—Joseph Martinez
(74) *Attorney, Agent, or Firm*—Staas & Halsey LLP (57) ABSTRACT

An optical pickup actuator includes a bobbin, support members, and a pair of magnetic circuits. An objective lens is mounted on the bobbin. The support members have first ends fixed on sides of the bobbin and second ends fixed to a holder placed on a portion of a base to allow the bobbin to move with respect to the base. The magnetic circuits are installed on two sides of the bobbin and on the base. Each magnetic circuit includes a tracking coil which moves the bobbin in a tracking direction, a plurality of focusing/tilting coils which moves the bobbin in at least one direction of a focusing direction and a tilting direction having a focusing component, and a magnet which faces the focusing/tilting coils and the tracking coil and have a polarized structure to move the bobbin in the tracking direction and at least one direction of the focusing direction and the tilting direction having the focusing component. Accordingly, the optical pickup actuator, which is capable of securing a tracking capacity and can become slimmer, can be obtained using the magnetic circuit including magnets having an improved polarized structure, a single tracking coil, and a plurality of focusing/tilting coils.

4 Claims, 7 Drawing Sheets

U.S. PATENT DOCUMENTS

| | | |
|---|---|---|
| 5,748,580 A | 5/1998 | Matsui |
| 5,949,590 A * | 9/1999 | Hong .................. 359/814 |
| 6,344,936 B1 * | 2/2002 | Santo et al. ............ 359/824 |
| 6,449,229 B1 | 9/2002 | Kim et al. |
| 2002/0054559 A1 | 5/2002 | Choi |

FOREIGN PATENT DOCUMENTS

| | | |
|---|---|---|
| EP | 1098304 A2 | 5/2001 |
| EP | 1 124 222 | 8/2001 |
| EP | 1 124 225 | 8/2001 |
| JP | 6-162540 | 6/1994 |
| JP | 7-105552 | 4/1995 |
| JP | 8-273176 | 10/1996 |
| JP | 2002-30275 | 1/2000 |
| JP | 2001-167458 | 6/2001 |
| JP | 2001-229554 | 8/2001 |
| JP | 2002-117562 | 4/2002 |
| JP | 2002-245647 | 8/2002 |
| KR | 10064312 | 7/2001 |

OTHER PUBLICATIONS

Office Action mailed Jul. 13, 2004, issued with corresponding Japanese patent application.

Official Action issued by the Taiwanese patent Office on Jan. 12, 2005 with English Translation.

* cited by examiner

OPTICAL PICKUP ACTUATOR

CROSS-REFERENCE TO RELATED APPLICATIONS

This application is a continuation of U.S. patent application Ser. No. 10/337,888 filed Jan. 8, 2003, now U.S. Pat. No. 7,006,307 which claims the priority of Korean Patent Application No. 2002-987, filed Jan. 8, 2002 in the Korean Intellectual Property Office, the disclosure of which is incorporated herein in its entirety by reference.

BACKGROUND OF THE INVENTION

1. Field of the Invention

The present invention relates to an optical pickup actuator, and more particularly, to an optical pickup actuator having an improved and slim structure which can secure an efficient tracking.

2. Description of the Related Art

In general, optical pickups are installed in optical recording and/or reproducing apparatuses to record and/or reproduce information on and/or from a recording medium, such as an optical disc, and move in a radial direction of the optical disc without contacting the optical disc.

The optical pickups require an actuator which moves an objective lens in a tracking direction, a focusing direction, and/or a tilting direction to spot a laser beam emitted from a light source on a correct portion of the optical disc. Here, a tracking direction movement indicates an adjustment of the objective lens in the radial direction of the optical disc to form a light spot in a center of a track.

A general optical pickup actuator includes a bobbin which is movably installed on a base, suspensions which support the bobbin to allow the bobbin to move above the base, and magnetic circuits which are installed in the bobbin and the base.

The optical pickup actuator basically carries out tracking and focusing movements, i.e., a biaxial movement. It is a general tendency that the recording and/or reproducing apparatuses are miniaturized and become lightweight thereof while using high recording density media.

For the use of the high recording density media, the optical pickup actuator requires a triaxial or quadriaxial movement including a tilting movement in addition to the existing biaxial movement. Recently, for the use of the high recording density media, as a numerical aperture (NA) of the objective lens has been made larger, and a wavelength of the laser beam of the light source has been shortened, a tilting margin of the optical pickup actuator has been decreased. Thus, a triaxial or quadriaxial movement optical pickup actuator, which is able to perform the tilting movement as well as the existing biaxial movements, is required. The triaxial movement includes the focusing movement, tracking movement, and a radial tilting movement, while the quadriaxial movement includes a tangential tilting movement in addition to the above motions. The biaixial, triaxial, or quadriaxial movement of the optical pickup actuator depends on a configuration of the magnetic circuits of the actuator.

Also, the optical pickup actuator needs to be reduced in height to be miniaturized.

Figure 1:
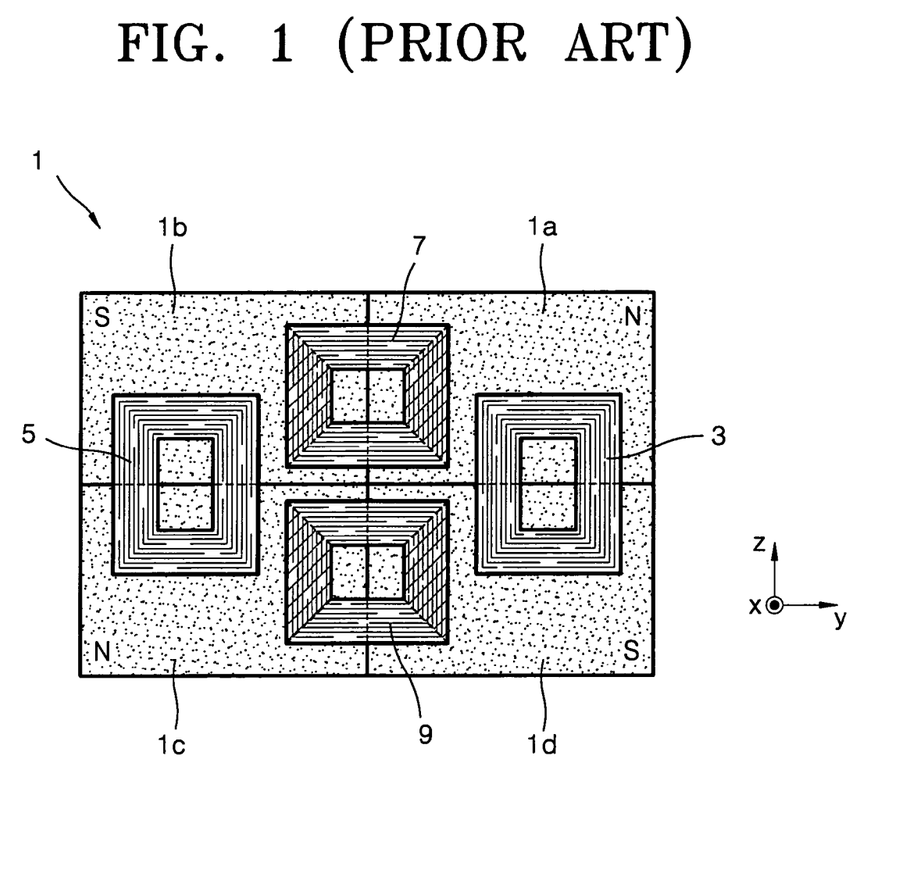
FIG. 1 is a view of a conventional magnetic circuit used in an optical pickup actuator.

FIG. 1 is a view of an example of a conventional magnetic circuit used in an optical pickup actuator. The use of the magnetic circuit shown in FIG. 1 enables the optical pickup actuator to perform a triaxial movement.

Referring to FIG. 1, the conventional magnetic circuit includes a magnet 1 which is divided into four polarized surfaces to be properly distributed into N poles and S poles, first and second focusing coils 3 and 5, and first and second tracking coils 7 and 9.

The first and second focusing coils 3 and 5, and the first and second tracking coils 7 and 9 are installed on sides of a moving unit of the optical pickup actuator, i.e., a bobbin. The magnet 1 is installed on a base to face the first and second focusing coils 3 and 5 and the first and second tracking coils 7 and 9.

As shown in FIG. 1, on a y-z coordinate plane, first through fourth polarizations 1a, 1b, 1c, and 1c of the magnet 1, respectively corresponding to first through fourth quadrants, are an N pole, an S pole, an N pole, and an S pole, respectively. The first focusing coil 3 ranges over the first and fourth polarizations 1a and 1d, and the second focusing coil 5 ranges over the second and third polarizations 1b and 1c. The first tracking coil 7 ranges over the first and second polarizations 1a and 1b, and the second tracking coil 9 ranges over the third and fourth polarizations 1c and 1d.

Using the conventional magnetic circuit having the above-described structure, a moving unit of the optical pickup actuator can move in a focusing direction, a tracking direction, and a tilting direction.

When currents flow in the first and second focusing coils 3 and 5 in counterclockwise and clockwise directions, respectively, a force acts in the first and second focusing coils 3 and 5 in a +focusing direction (z-axis direction). When directions of the currents flowing in the first and second focusing coils 3 and 5 are changed to opposite directions, respectively, the force acts in the first and second focusing coils 3 and 5 in a −focusing direction (−z-axis direction). Thus, an objective lens mounted in the moving unit of the optical pickup unit can move in the focusing direction.

When the currents are supplied to the first and second focusing coils 3 and 5 in the same direction (clockwise direction), the force acts in the first focusing coil 3 in the +focusing direction (z-axis direction), and the force acts in the second focusing coil 5 in the −focusing direction (−z-axis direction). Also, when the directions of the currents applied to the first and second focusing coils 3 and 5 are respectively changed into opposite directions, the force acts in the first focusing coil 3 in the −focusing direction (−z-axis direction), and the force acts in the second focusing coil 5 in the +focusing direction (z-axis direction). Thus, the moving unit of the optical pickup actuator can move in the tilting direction, e.g., in a radial tilting direction, to adjust a tilt of the objective lens mounted in the moving unit.

When the currents flow in the first and second tracking coils 7 and 9 in clockwise and counterclockwise directions, the force acts in the first and second tracking coils 7 and 9 in a left direction (−y-axis direction). When the directions of the currents flowing in the first and second tracking coils 7 and 9 are changed to opposite directions, respectively, the force acts in the first and second tracking coils 7 and 9 in a right direction (y-axis direction). As a result, since the moving unit of the optical pickup actuator can move in the tracking direction, the moving unit can control the objective lens mounted therein so as to correctly follow a track.

Accordingly, if a pair of magnetic circuits having the above-described structure are installed on corresponding ones of two sides of the moving unit of the optical pickup actuator, the moving unit can move in the focusing, tracking, and radial tilting directions, i.e., in triaxial directions.

However, due to an arrangement of the polarizations 1a through 1d of the magnet 1 for the triaxial movement, the conventional magnetic circuit having the above-described structure should have the first and second tracking coils 7 and 9, that are disposed in the focusing direction, and the first and second tracking coils 7 and 9 have to be spaced apart from each other. Thus, since effective coil lengths of portions (marked with slanting lines in FIG. 1) of the first and second tracking coils 7 and 9 contributing to the tracking direction movement are short, the conventional magnetic circuit has difficulty in becoming slim (reducing a height thereof when securing an efficient tracking. Also, when the conventional magnetic circuit becomes slim, it has a structural drawback in considerably deteriorating a tracking efficiency.

SUMMARY OF THE INVENTION

Accordingly, the present invention provides an optical pickup actuator including magnetic circuits having an improved and slim structure which can secure an efficient tracking.

Additional aspects and advantages of the invention will be set forth in part in the description which follows and, in part, will be obvious from the description, or may be learned by practice of the invention.

According to an aspect of the present invention, an optical pickup actuator includes a bobbin, support members, and a pair of magnetic circuits. An objective lens is mounted on the bobbin. The support members have first ends fixed on sides of the bobbin and second ends fixed to a holder disposed on a portion of a base to allow the bobbin to move with respect to the base. The magnetic circuits are installed on two sides of the bobbin and on the base. Each magnetic circuit includes a tracking coil which moves the bobbin in a tracking direction, a plurality of focusing/tilting coils which move the bobbin in at least one direction of a focusing direction and a tilting direction having a focusing component, and a magnet which faces the focusing/tilting coils and the tracking coil and has a polarized structure to move the bobbin in the tracking direction and at least one of the focusing direction and the tilting direction having the focusing component.

The magnet includes first and second magnet parts which are co-linear and which have opposite polarization arrangements, and third and fourth magnet parts which are partially enclosed by the first and second magnet parts and have opposite polarization arrangements to those of the first and second magnet parts. The tracking coil ranges over the first and second magnet parts, and the focusing/tilting coils include a first focusing/tilting coil, which ranges over the first and third magnet parts, and a second focusing/tilting coil, which ranges over the second and fourth magnet parts.

The third and fourth magnet parts are respectively located in a middle of the first and second magnet parts in the focusing direction, the first focusing/tilting coil includes a pair of sub-first focusing/tilting coils which range over the first and third magnet parts to be disposed in the focusing direction, and the second focusing/tilting coil includes a pair of sub-second focusing/tilting coils which range over the second and fourth magnet parts to be disposed in the focusing direction.

Here, at least three sides of the third magnet part and at least three sides of the fourth magnet part face the first and second magnet parts, respectively.

The third and fourth magnet parts are respectively positioned at corresponding corners of the first and second magnet parts in the focusing direction.

At least two sides of the third magnet part and at least two sides of the fourth magnet part face the first and second magnet parts, respectively.

It is possible that the magnet has four polarized surfaces or is respectively formed by arranging two sets of magnets having two polarized surfaces.

It is possible that a direction of a current that is applied to the focusing/tilting coils of at least one of the magnetic circuits is controlled to move the bobbin in at least one direction of a radial tilting direction and a tangential tilting direction.

It is possible that at least one of the focusing/tilting coils and the tracking coil is a fine pattern coil.

It is possible that the support members are fixed on another two sides of the bobbin different from the two sides of the bobbin on which the magnetic circuit is disposed.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Figure 2:
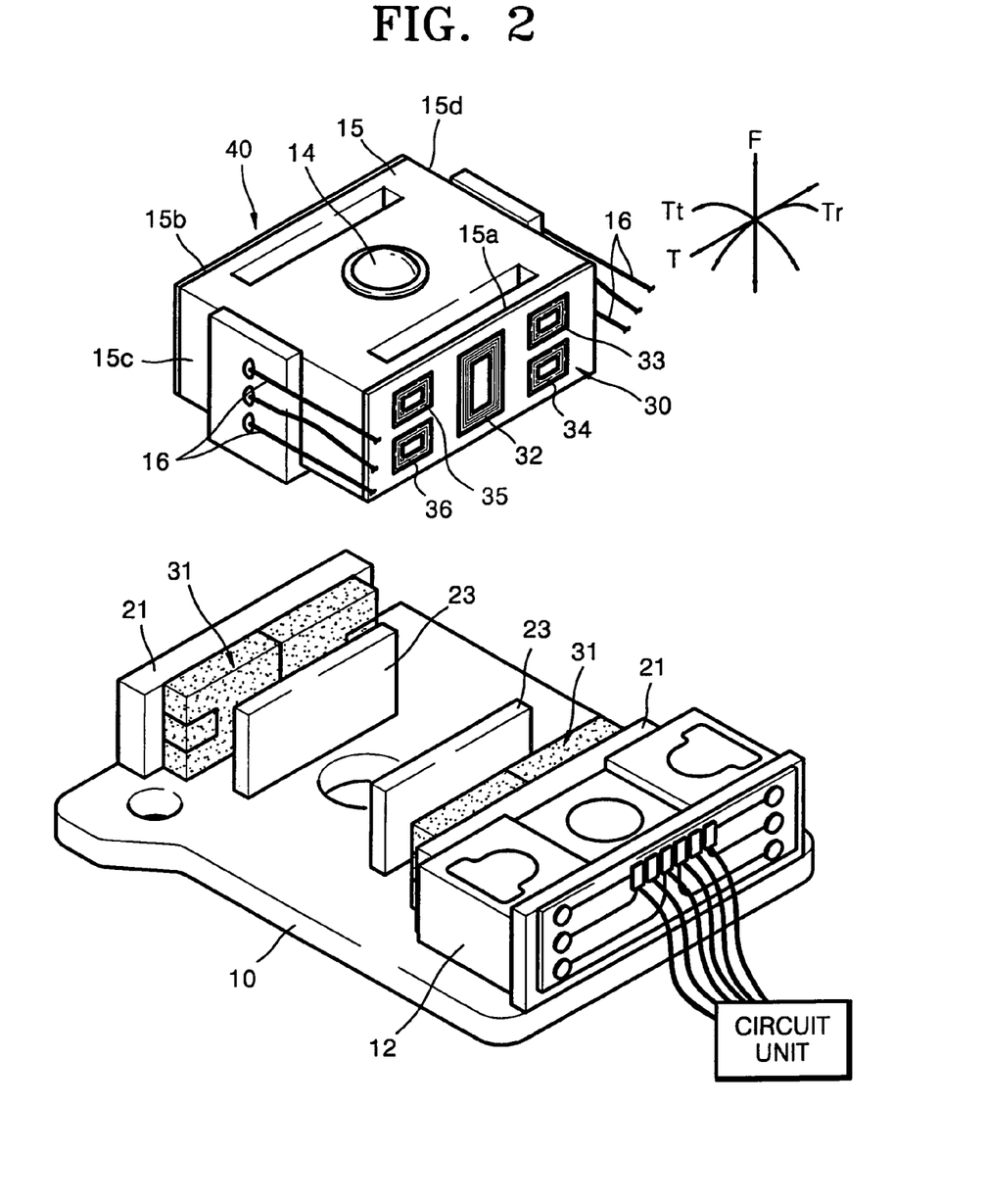
FIG. 2 is a partial exploded perspective view of an optical pickup actuator using a magnetic circuit according to an embodiment of the present invention.

FIG. 2 is a partial exploded perspective view of an optical pickup actuator using a magnetic circuit according to an embodiment of the present invention. In FIG. 2, F, T, Tr, and Tt denote a focusing direction, a tracking direction (corresponding to a radial direction of a disc-type recording medium), a radial tilting direction, and a tangential tilting direction, respectively. The radial tilting-direction Tr and the tangential tilting direction Tt include a focusing component to move the bobbin in the focusing direction.

Referring to FIG. 2, the optical pickup actuator includes a bobbin 15, supports 16, and a pair of magnetic circuits 30, 40. The bobbin 15 is moveably installed on a base 10 and has an objective lens 14 mounted therein. The supports 16 have one end fixed on sides 15c and 15d of the bobbin 15 and the other end coupled to a holder 12 disposed on a portion of the base 10 to allow the bobbin 15 to move with respect to the base 10. The magnetic circuits 30, 40 are installed on both sides 15a and 16b of the bobbin 15 and on the base 10 to be disposed opposite to each other with respect to the bobbin 15.

Also, the optical pickup actuator may further include outer yokes 21 on which magnets 31 corresponding to the magnetic circuits 30, 40 are fixed to guide a magnetic flux produced from the magnets 31, and inner yokes 23, or may include any one of the outer yokes 21 and the inner yokes 23.

The supports 16 are fixed on the sides 15c and 15c of the bobbin 15 but not on the sides 15a and 16b of the bobbin 15 on which the magnetic circuits 30, 40 are disposed, and may be a wire or a plate spring.

Each of the magnetic circuits 30, 40 includes a tracking coil 32, a plurality of focusing/tilting coils 33, 34, 35, and 36, and a magnet 31. The tracking coil 32 moves the bobbin 15 in the tracking direction T. The focusing/tilting coils 33, 34, 35, and 36 move the bobbin 15 in at least one of the focusing direction F and the tilting directions Tr, Tt having the focusing component. The magnet 31 faces the focusing/tilting coils 33, 34, 35, and 36 and the tracking coil 32.

The magnet 31 has a polarized structure to interact with the focusing/tilting coils 33, 34, 35, and 36 and the tracking coil 32, and to move the bobbin 15 in the tracking direction and at least one of the focusing direction F and the tilting directions Tr, Tt having the focusing component.

Figure 3:
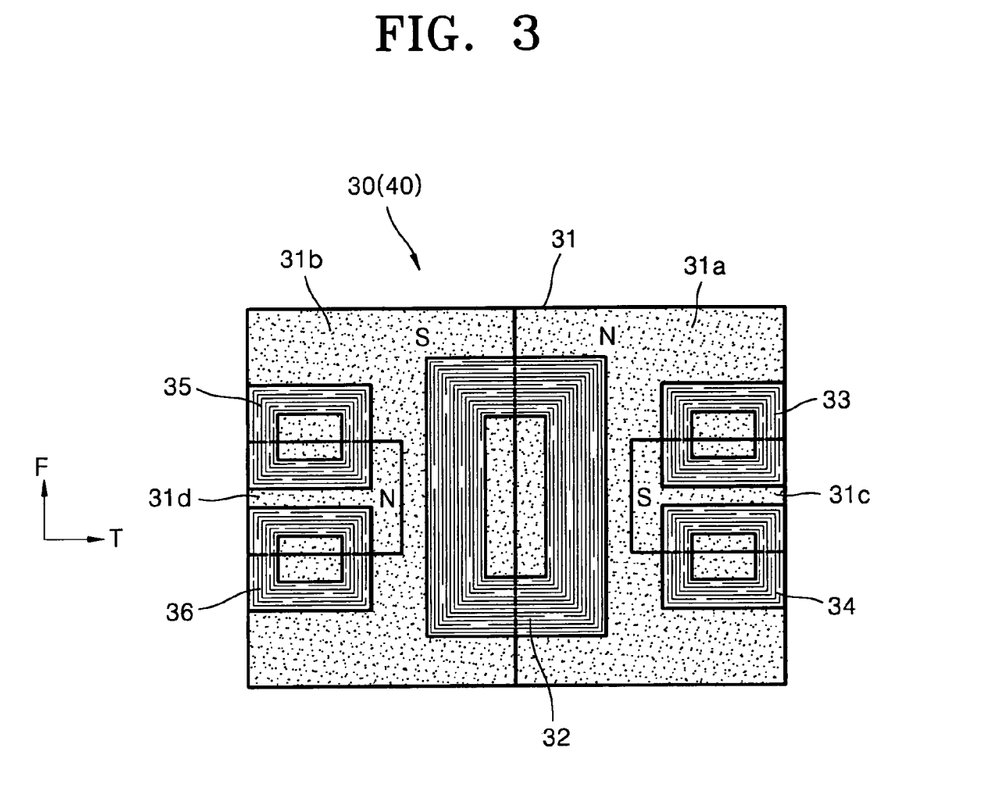
FIG. 3 is a schematic view of the magnetic circuit shown in FIG. 2.

In more detail, FIG. 3 shows coils and the magnet 31 of the magnetic circuits 30, 40 in the optical pickup actuator shown in FIG. 2. Referring to FIG. 3, the magnet 31 includes first and second magnet parts 31a and 31b, which are co-linear and have opposite polarization arrangements, and third and fourth magnet parts 31c and 31d which are at least partially enclosed by the first and second magnet parts 31a and 31b and have polarization arrangements respectively opposite to the first and second magnet parts 31a and 31b. In FIG. 3, top surfaces of the first through fourth magnet parts 31a, 31b, 31c, and 31d of the magnet 31 are an N pole, an S pole, an S pole, and an N pole, respectively. However, bottom surfaces of the first through fourth magnet parts 31a, 31b, 31c, and 31d have polarizations respectively opposite to the corresponding polarizations of the top surfaces.

When the magnet 31 has the above-described polarized structure, the tracking coil 32 ranges over the first and second magnet parts 31a and 31b. Also, the focusing/tilting coils 33, 34, 35, and 36 are classified into first focusing/tilting coils 33 and 34, which range over the first and third magnet parts 31a and 31c, and second focusing/tilting coils 35 and 36, which range over the second and fourth magnet parts 31b and 31d.

Referring to FIG. 3 showing the magnetic circuits 30, 40, the magnet 31 has a structure in which the third and fourth magnet parts 31c and 31d are respectively positioned in midst the first and second magnet parts 31a and 31b along corresponding heights of the first and second magnet parts 31a and 31b. Here, the magnet 31 has a structure in which at least three sides of the third magnet part 31c and at least three sides of the fourth magnet part 31d face the first and second magnet parts 31a and 31b, respectively.

For example, as shown in FIG. 3, the magnet 31 may have a structure in which three sides of the third magnet part 31c and three sides of the fourth magnet 31d face the first and second magnet parts 31a and 31b, respectively.

The structure of the magnet 31 may be variously modified within a range satisfying a requirement that at least three sides of the third magnet part 31c and at least three sides of the fourth magnet parts 31d face the first and second magnet parts 31a and 31b, respectively. For example, the magnet 31 may have a structure in which the third and fourth magnet parts 31c and 31d are positioned inside the first and second magnet parts 31a and 31b so that four sides of the third magnet part 31c and four sides of the fourth magnet part 31d contact the first and second magnet parts 31a and 31b, respectively. If the third and fourth magnetic parts 31c and 31d have a curved portion, the curved portion contacts the first and second magnetic parts 31a and 31b, respectively.

When the magnet 31 has the polarized structure shown in FIG. 3, it is possible that the first focusing/tilting coils 33 and 34 are disposed in the focusing direction, and also, the second focusing/tilting coils 35 and 36 are disposed in the focusing direction.

The magnetic circuit 30 may have the magnet 31 shown in FIG. 3 or a magnet polarized surface divided into four poles shown in FIG. 7, which will be described later. Alternatively, the magnet 31 of the magnetic circuit 30, 40 may include a pair of bipolar magnets each having a polarized surface. For example, the magnet 31 may include a set of a surface polarized bipolar magnet having the first and third magnet parts 31a and 31c and a surface polarized bipolar magnet having the second and fourth magnet parts 31b and 31d.

When the magnet 31 has the above-described surface polarized structure, an air gap magnetic flux density can be improved.

Figure 7:
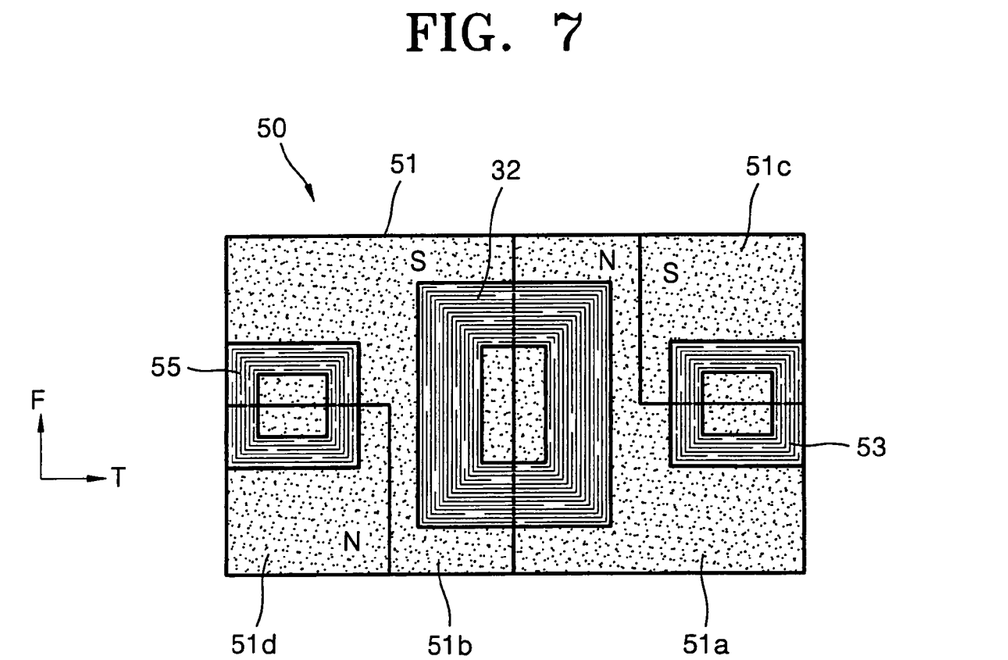
FIG. 7 is a schematic view of a magnetic circuit according to another embodiment of the present invention.

Alternatively, the magnet 31 may be formed with separately manufactured magnets arranged in the polarized structures shown in FIGS. 3 and 7.

Meanwhile, it is possible that at least one of the focusing/tilting coils 33, 34, 35, and 36 and the tracking coil 32 of the magnetic circuit 30 is a fine pattern coil. Since the fine pattern coil, which is made by patterning coil on a film, is thin, the fine pattern coil can contribute greatly to reducing a weight of a moving unit of the optical pickup actuator and compacting the optical pickup actuator, e.g., reducing a size of the optical pickup actuator. In FIG. 2, the first and second focusing/tilting coils 35 and 36 and the tracking coil 32 are formed in fine patterns on a single film.

Alternatively, the magnetic circuits 30, 40 may have bulk-type coils, which are made by winding a copper wire, as the focusing/tilting coils 33, 34, 35, and 36 and/or the tracking coil 32.

The optical pickup actuator having the magnetic circuits 30, 40 moves the objective lens 14 mounted in the bobbin 15 of the moving unit in the tracking direction T and in at least one of the focusing direction F and the tilting directions Tt, Tr having the focusing component.

Hereinafter, with reference to FIGS. 4A through 6B, there will be described an example in which the first through fourth magnet parts 31a, 31b, 31c, and 31d of the magnet 31 are an N pole, an S pole, an S pole, and an N pole, respectively, on a T-F (tracking direction-focusing direction) coordinate plane, and the tracking coil 32 and the focusing/tilting coils 33, 34, 35, and 36 are installed on the moving unit of the optical pickup actuator.

Figure 4A:
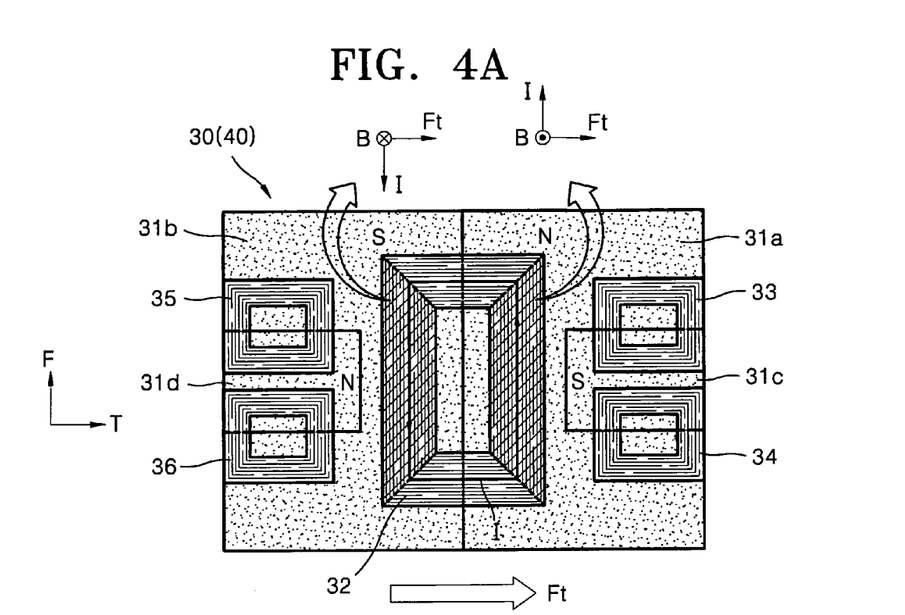
FIGS. 4A and 4B are views explaining a principle of moving a moving unit of the optical pickup actuator in a tracking direction using the magnetic circuit shown in FIGS. 2 and 3.
Figure 4B:
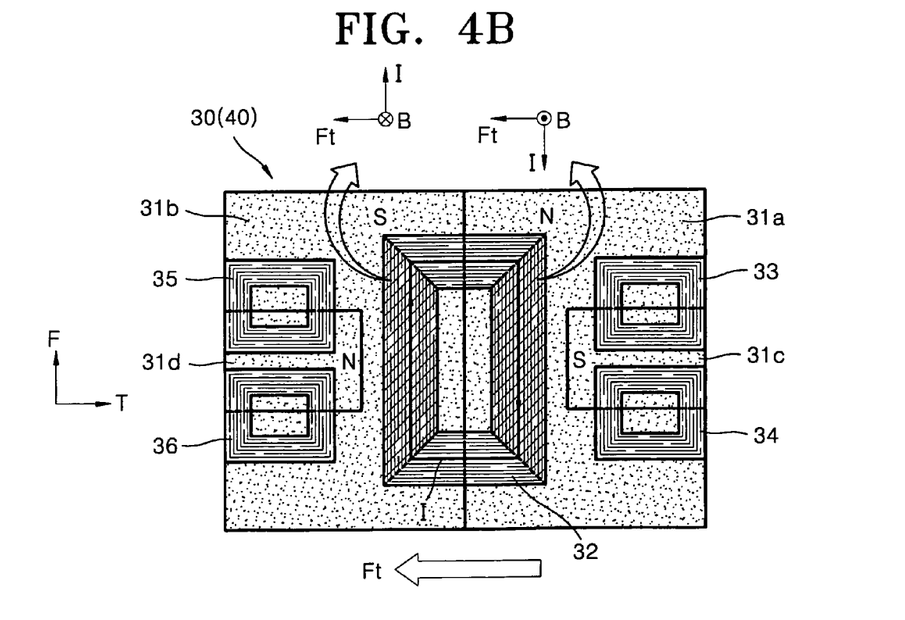

FIGS. 4A and 4B are views explaining a principle of moving the moving unit of the optical pickup actuator in the tracking direction using the magnetic circuits 30, 40 shown in FIGS. 2 and 3. As shown in FIG. 4A, when a current flows through the tracking coil 32 in a counterclockwise direction, a magnetic force Ft acts in the tracking coils 32 in a right direction (a +T direction). In contrast, as shown in FIG. 4B, when the current flows through the tracking coil 32 in a clockwise direction, the magnetic force Ft acts in the tracking coil 32 in a left direction (−T direction).

As described above, depending on a direction of the current which is applied to the tracking coil 32, the magnetic force acts in the moving unit of the optical pickup actuator in the right or left direction. As a result, the moving unit moves in the tracking direction. Thus, by properly controlling the direction of the current which is applied to the tracking coil 32, the objective lens 14 mounted in the moving unit can follow a correct position of a track (a center of the track).

Here, since each of the magnetic circuits 30, 40 of the optical pickup actuator includes the single tracking coil 32 marked with slanting lines in FIGS. 4A and 4B, an effective coil length of the tracking coil 32 contributing to a tracking movement can become longer compared to a conventional structure in which two tracking coils are arranged in the focusing direction. Therefore, it is possible to make the optical pickup actuator slimmer by reducing a height of the optical pickup actuator and securing a desired tracking efficiency.

Figure 5A:
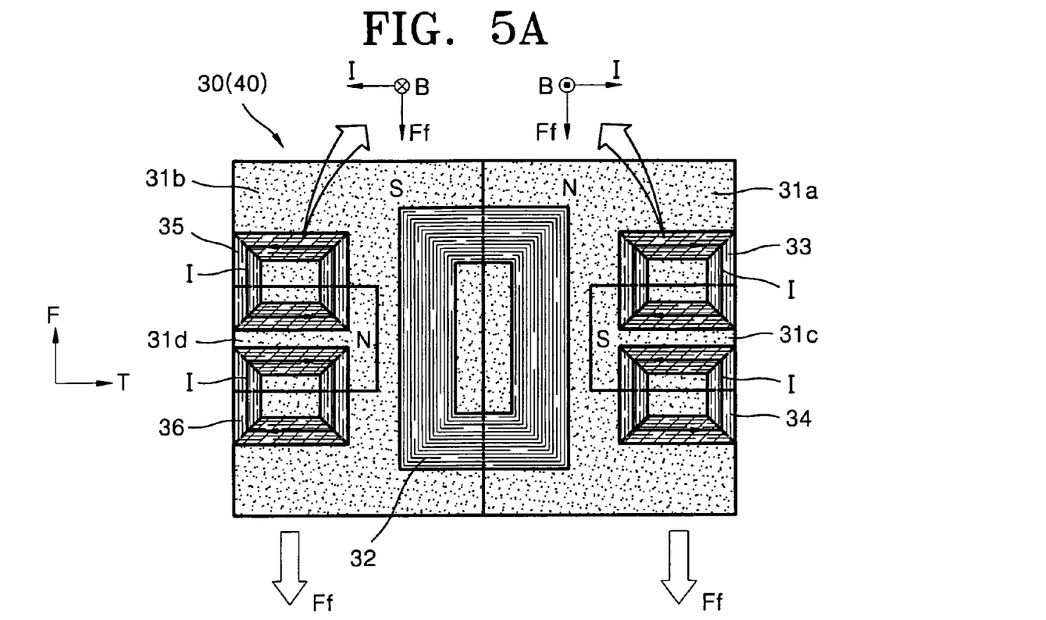
FIGS. 5A and 5B are views explaining a principle of moving the moving unit of the optical pickup actuator in a focusing direction using the magnetic circuit shown in FIGS. 2 and 3.
Figure 5B:
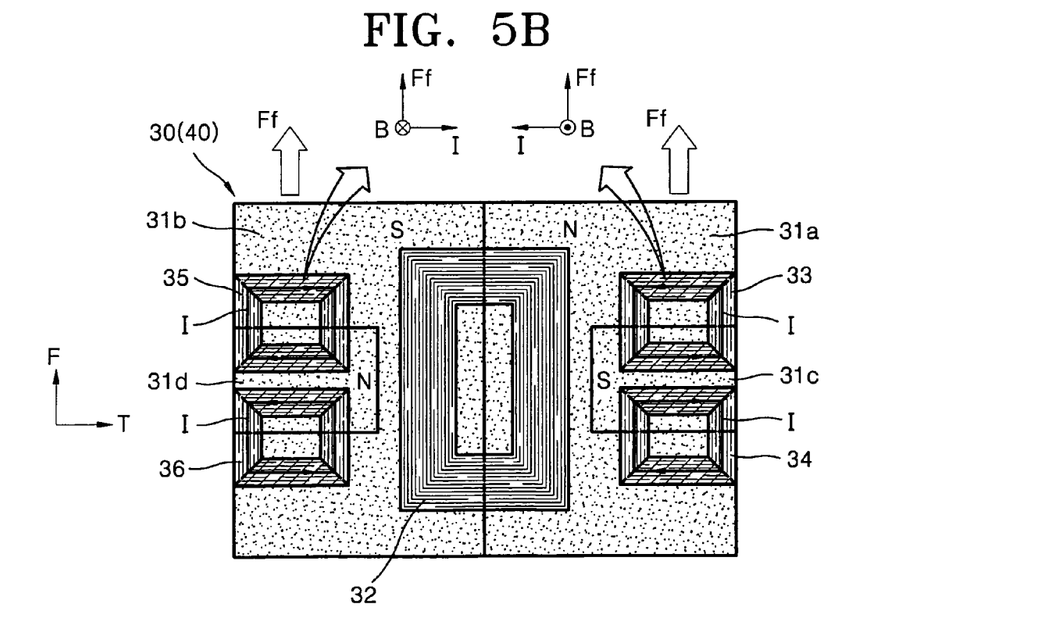

FIGS. 5A and 5B are views explaining a principle of moving the moving unit of the optical pickup actuator in the focusing direction F using the magnetic circuits 30, 40 shown in FIGS. 2 and 3.

Supposing, as shown in FIG. 5A, a current flows through the first focusing/tilting coil 33, positioned above in a height direction of the first magnet part 31a, in the clockwise direction while a current flows through the first focusing/tilting coil 34, positioned below in the height direction, in the counterclockwise direction. Also, supposing a current flows through the second focusing/tilting coil 35, positioned above in the height direction, in the counterclockwise direction while a current flows through the second focusing/tilting coil 36, positioned below in the height direction, in the clockwise direction. Then, a magnetic force Ff acts downward in both pairs of first focusing/tilting coils 33 and 34, and second focusing/tilting coils 35 and 36. Also, as shown in FIG. 5B, when currents flow through the pair of the first focusing/tilting coils 33 and 34, and the pair of second focusing/tilting coils 35 and 35 in opposite directions to those of the currents in FIG. 5A, the magnetic force Ff acts upward in both pairs.

As described above, according to the directions of the currents which are applied to the first and second focusing/tilting coils 33, 34, 35 and 36, the magnetic force acts upward or downward in the moving unit of the optical pickup actuator. As a result, the moving unit moves in the focusing direction F. Thus, by properly controlling the directions of the currents which are applied to the first and second focusing/tilting coils 33, 34, 35 and 36, a position of the objective lens 14 mounted in the moving unit can vary in the focusing direction F.

Figure 6A:
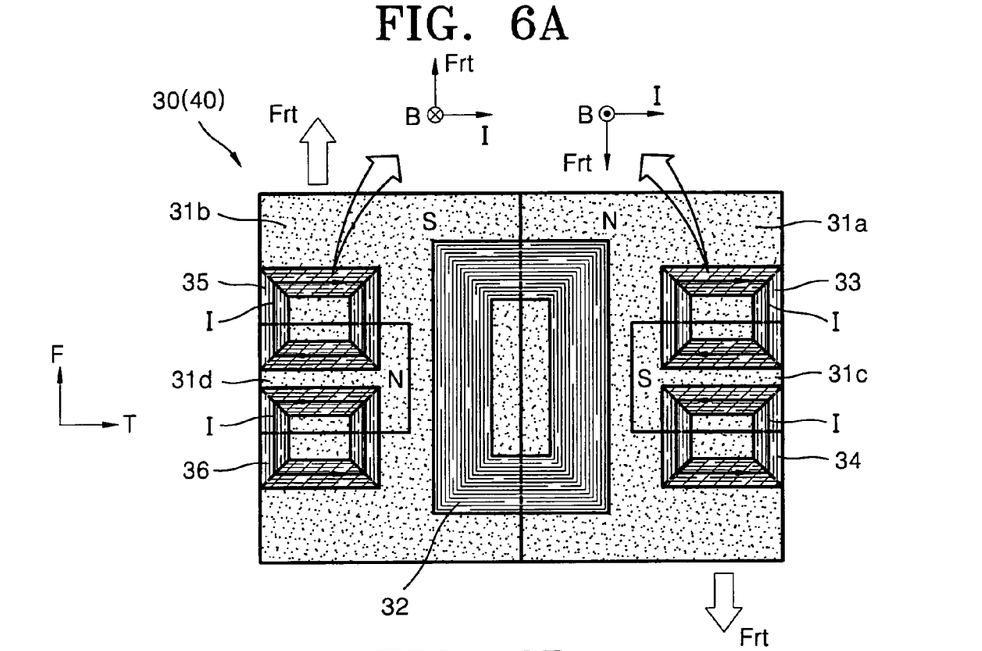
FIGS. 6A and 6B are views explaining a principle of moving the moving unit of the optical pickup actuator in a radial tilting direction using the magnetic circuit shown in FIGS. 2 and 3.
Figure 6B:
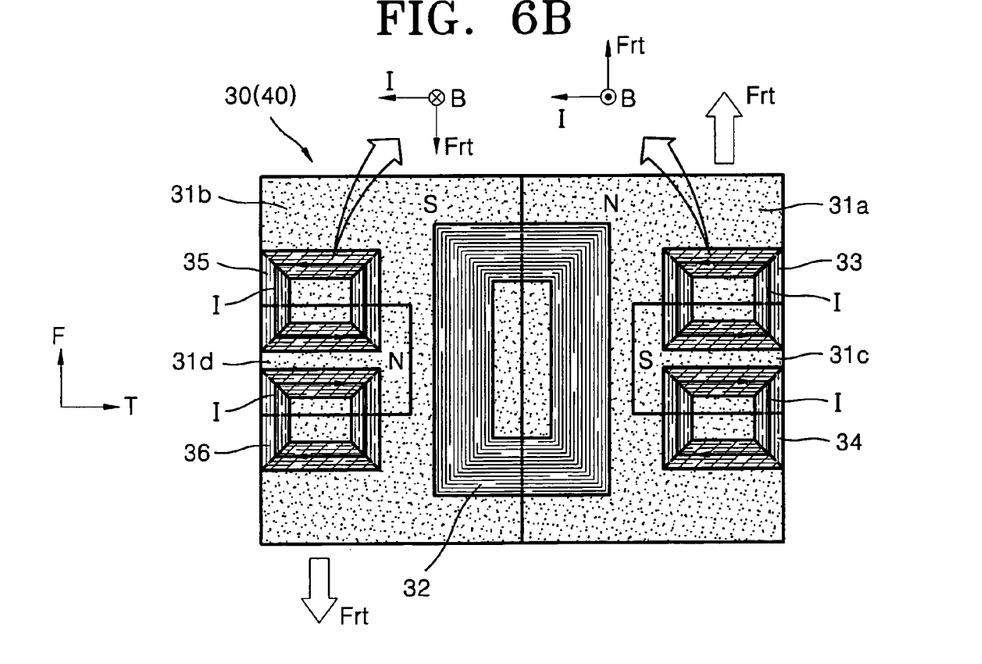

FIGS. 6A and 6B are views explaining a principle of moving the moving unit of the optical pickup actuator in the radial tilting direction Tr using the magnetic circuits 30, 40 shown in FIGS. 2 and 3. When the moving unit moves in the radial tilting direction Tr, an asynchronization signal is input to the focusing/tilting coils 33, 34, 35, and 36 in one of the magnetic circuits 30, 40.

Supposing, as shown in FIG. 6A, that a current flows through the first and second focusing/tilting coils 33 and 35, which are positioned upward in the focusing direction of the optical pickup actuator, in the clockwise direction, and a current flows through the first and second focusing/tilting coils 34 and 36, positioned below the first and second focusing/tilting coils 33 and 35 in the focusing direction, in the counterclockwise direction. Then, a tilting magnetic force Frt acts downward in the pair of first focusing/tilting coils 33 and 34, and the tilting magnetic force Frt acts upward in the pair of second focusing/tilting coils 35 and 36. Also, as shown in FIG. 6B, when currents flow through the pair of first focusing/tilting coils 33 and 34 and the pair of second focusing/tilting coils 35 and 36 in opposite directions to those of the currents in FIG. 6A, the tilting magnetic force Frt acts upward in the first focusing/tilting coils 33 and 34 and the tilting magnetic force Frt acts downward in the second focusing/tilting coils 35 and 36.

As described above, depending on the directions of the currents which are applied to the first and second focusing/tilting coils 33, 34, 35, and 36, the tilting magnetic force Frt acts upward one side of the moving unit of the optical pickup actuator in the radial tilting direction Tr, and downward to move the other side of the moving unit of the optical pick up actuator in the radial tilting direction Tr. As a result, the moving unit moves in the radial tilting direction. Thus, by properly controlling the directions of the current which are applied to the first and second focusing/tilting coils 33, 34, 35, and 36, a relative radial tilt of the objective lens 14 mounted in the moving unit can be adjusted.

Here, in FIGS. 5A, 5B, 6A, and 6B, the slanting lines in the first and second focusing/tilting coils 33, 34, 35, and 36 are effective coil portions that contribute to the generation of the tilting magnetic force Frt.

As described above, in the optical pickup actuator having the magnetic circuits 30, 40 according to this embodiment of the present invention, the moving unit can move in a triaxial direction.

Since the optical pickup actuator includes a pair of the magnetic circuits 30, 40, the asynchronous signal is input to the magnetic circuits 30, 40 so that in the magnetic circuits 30 disposed on the side 15a of the bobbin 15, the magnetic force Ft acts downward as described with reference to FIG. 5A, and in the magnetic circuit 40 on the side 15b of the bobbin 15, the magnetic force Ft acts upward as described with reference to FIG. 5B. As a result, the moving unit can move in the tangential tilting direction Tt.

Accordingly, when the currents that are applied to the first and second focusing/tilting coils 33, 34, 35, and 36 of the magnetic circuits 30, 40 are controlled as described above, the optical pickup actuator can move the moving unit in the quadriaxial direction.

In the optical pickup actuator shown in FIG. 2, the coils 33, 34, 35, and 36 of the magnetic circuits 30, 40 are installed on the moving unit, i.e., the bobbin 15, and the magnets 31 of the magnetic circuits 30, 40 are installed on the base 10. However, this is only an example and the locations for the installation of the coils 33, 34, 35, and 36 and the magnet 31 of the magnetic circuits 30, 40 may be opposite. Also, the optical pickup actuator according to the present invention may be variously modified except the magnetic circuit 30, and is not restricted to the structure shown in FIG. 2.

Meanwhile, the optical pickup actuator according to the present invention may include magnetic circuit 50 according to another embodiment of the present invention, shown in FIG. 7, instead of the magnetic circuits 30, 40 shown in FIGS. 3 through 6B.

Referring to FIG. 7, in the magnetic circuit 50, a magnet 51 has a structure in which third and fourth magnet parts 51c and 51d are respectively positioned at corresponding corners of first and second magnet parts 51a and 51b in the focusing direction F. Here, in the magnet 51, two sides of the third magnet part 51a and two sides of the fourth magnet part 51d face the first and second magnet parts 51a and 51b, respectively.

In FIG. 7, the third magnet part 51c is positioned below and the fourth magnet part 51d is positioned above, along the focusing direction. However, positions of the third and fourth magnet parts 51c and 51d may be reversed or both the third and fourth magnet parts 51c and 51c may be positioned above or below along a height direction of the first and second magnet parts 51a and 51b, respectively.

If the magnet 51 has a polarized structure as shown in FIG. 7, it is sufficient that the first and second focusing/tilting coils 53 and 55 are respectively formed in a single body.

The optical pickup actuator having the magnetic circuit 50 can carry out the triaxial or quariaxial movement like as when the optical pickup actuator has the magnetic circuits 30, 40 shown in FIGS. 2 to 6B.

Here, the triaxial or quadriaxial movement of the optical pickup actuator having the magnetic circuit 50 can be fully known from the foregoing embodiment shown in FIGS. 2 to 6B. Thus, descriptions of the principle of the triaxial or quadriaxial movement will be omitted.

In FIGS. 2 through 8, the first through fourth magnet parts of the magnets 31 and 51 of the magnetic circuits 30, 40 and 50 according to the embodiments of the present invention are adjacent to one another. However, this is only an example. In other words, the first through fourth magnet parts 31c and 31d or 51c and 51d of the magnets 31 and 51 of the magnetic circuits 30, 40 and 50 may be spaced-apart from one another.

As described above, according to the present invention, an optical pickup actuator, which is capable of performing a tilting movement without a large sensitivity loss (in particular, sensitivity of a tracking movement) even when a desired limitation of a height is required in an optical system, can be obtained. The optical pickup actuator can be used in recording and/or reproducing apparatuses which record and/or reproduce information on and/or from DVD-RAM-family recording media or DVD-RAM- and CD-family recording media.

Also, the optical pickup actuator, which does not perform a tilting movement and needs to reduce the height of the optical system, can be obtained. The optical pickup actuator can be used in recording and/or reproducing apparatuses which record and/or reproduce information on and/or from CDs, DVDs, CD-RWs, DVD-ROMs, or the like.

Further, the optical pickup actuator, which is capable of securing a tracking capacity and can become slim, can be obtained using a magnetic circuit including magnets having improved polarized structures, a single tracking coil, and a plurality of focusing/tilting coils.

Also, the optical pickup actuator according to the present invention can perform the biaxial, triaxial, or quadriaxial movement by controlling a signal input to the magnetic circuit.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. A magnet for an optical pickup actuator having a bobbin in which a lens is mounted, consisting of:
    a first magnet part;
    a second magnet part co-linear with the first magnet part, wherein the first and second magnet parts have opposite polarization;
    a third magnet part formed in the first magnet part; and
    a fourth magnet part formed in the second magnet part, wherein the third magnet part and the fourth magnet part are positioned on the opposite corners of the magnet so that a plane extending from a side of the third magnet part does not face a plane extending from a side of the fourth magnet part.

2. A magnet circuit for an optical pickup actuator, having a bobbin in which a lens is mounted, comprising:
    a tracking coil interacting with a magnet to generate a first force moving the bobbin in a tracking direction,
    a plurality of focusing/tilting coils interacting with the magnet to generate a second force and a third force moving the bobbin in a focusing direction and a tilting direction having a focusing component respectively,
    wherein the magnet consists of:
        first and second magnet parts that are co-linear, and
        third and fourth magnet parts that are positioned in opposite corners within the first and second magnet pads, respectively, and are positioned either above or below a height direction of the first and second magnet pads along a focusing direction of the bobbin.

3. The magnet circuit according to claim 2, wherein the third magnet part is positioned on the magnet so as not to face the fourth magnet part.

4. The magnet circuit according to claim 2, wherein the tracking coil is a fine pattern coil.

* * * * *

UNITED STATES PATENT AND TRADEMARK OFFICE
CERTIFICATE OF CORRECTION

PATENT NO. : 7,369,335 B2  Page 1 of 1
APPLICATION NO. : 11/245191
DATED : May 6, 2008
INVENTOR(S) : Dae jong Jang et al.

It is certified that error appears in the above-identified patent and that said Letters Patent is hereby corrected as shown below:

First Page item (60), Column (Related U.S. Application Data), Line 1, change "Provisional application" to --Continuation--.

Column 10, Line 42, change "pads," to --parts,--.

Column 10, Line 44, change "pads," to --parts,--.

Signed and Sealed this

Thirtieth Day of September, 2008

JON W. DUDAS
*Director of the United States Patent and Trademark Office*